US008144894B2

(12) United States Patent
Rosen

(10) Patent No.: US 8,144,894 B2
(45) Date of Patent: Mar. 27, 2012

(54) DUCTING SOUND

(75) Inventor: Michael Rosen, Weston, MA (US)

(73) Assignee: Bose Corporation, Framingham, MA (US)

( * ) Notice: Subject to any disclaimer, the term of this patent is extended or adjusted under 35 U.S.C. 154(b) by 785 days.

(21) Appl. No.: 12/249,033

(22) Filed: Oct. 10, 2008

(65) Prior Publication Data

US 2010/0092006 A1 Apr. 15, 2010

(51) Int. Cl.
*H04B 1/00* (2006.01)

(52) U.S. Cl. ........................................................ 381/86

(58) Field of Classification Search ..................... 381/86
See application file for complete search history.

(56) References Cited

U.S. PATENT DOCUMENTS

| | | | | |
|---|---|---|---|---|
| 4,085,289 | A | 4/1978 | Schmideler | |
| 4,509,184 | A | 4/1985 | Yanagawa et al. | |
| 4,924,962 | A * | 5/1990 | Terai et al. | 181/141 |
| 5,193,118 | A | 3/1993 | Latham-Brown et al. | |
| 6,226,927 | B1 | 5/2001 | Bertolini et al. | |
| 6,937,740 | B2 | 8/2005 | Dage | |
| 7,343,020 | B2 | 3/2008 | Thigpen | |
| 2003/0219137 | A1* | 11/2003 | Fincham | 381/302 |
| 2004/0062001 | A1 | 4/2004 | Chang et al. | |
| 2005/0135642 | A1 | 6/2005 | Dry | |
| 2008/0101645 | A1 | 5/2008 | Rosen | |
| 2010/0040242 | A1* | 2/2010 | Yamaguchi | 381/86 |

FOREIGN PATENT DOCUMENTS

| | | | |
|---|---|---|---|
| EP | 1475991 | | 11/2004 |
| EP | 1519617 | A2 | 3/2005 |
| FR | 2780010 | | 12/1999 |

OTHER PUBLICATIONS

International Search Report and Written Opinion for PCT/US2009/057792, dated Dec. 1, 2009.

* cited by examiner

*Primary Examiner* — Thao Le
(74) *Attorney, Agent, or Firm* — Bose Corporation

(57) ABSTRACT

A sound reproduction system in a vehicle includes an acoustic package including an electroacoustic transducer and a sound duct that carries the sound from the electroacoustic transducer. The sound duct carries the sound to an outlet at a location in the vehicle at which radiated sound efficiently drives selected audio modes of the vehicle.

23 Claims, 7 Drawing Sheets

DUCTING SOUND

BACKGROUND

The interior space of an automobile presents a challenging environment for the presentation of high-quality audio. Among other challenges, audio needs to be produced at high volume without distortion to overcome road noise and vehicle noise, especially at highway speeds.

SUMMARY

In general, in some aspects, a sound reproduction system in a vehicle includes an acoustic package including an electroacoustic transducer and a sound duct that carries the sound from the electroacoustic transducer. The sound duct carries the sound to an outlet at a location in the vehicle at which radiated sound efficiently drives selected audio modes of the vehicle.

Implementations may include one or more of the following. The location in the vehicle of the sound duct outlet is at a forward bulkhead of the vehicle. The location in the vehicle of the sound duct outlet is at the forward bulkhead where the forward bulkhead meets a floor of the vehicle. The sound duct includes a waveguide. The sound duct includes a bass reflex port. The sound duct includes an acoustic volume. A first passive radiator is attached to the sound duct at the outlet of the duct. A second passive radiator is attached to the sound duct at the outlet of the duct, the second passive radiator being positioned facing the first passive radiator so that vibrations imparted to surrounding structures from the first and second passive radiators cancel each other. Electronics operate the electroacoustic transducer, and the electronics and the acoustic package together form a removable module. The duct is contained within an instrument panel of the vehicle.

In general, in some aspects, a sound reproduction system in a vehicle includes a removable module including a electroacoustic transducer and a sound duct that carries the sound from the electroacoustic transducer at a first location to an outlet at a second location in the vehicle that is distinct from the first location.

Implementations may include one of more of the following. The second location is a location at which radiated sound efficiently drives selected audio modes of the vehicle. An interface couples the transducer to the duct. The interface includes a bass reflex port. The interface includes an acoustic volume. The interface includes an acoustic waveguide. The duct includes an interface for coupling to the transducer. The removable module fits within a 2 DIN volume. The removable module is coupled to the duct at the first location. Sound generated by the electroacoustic transducer within the removable module is provided to the duct.

In general, in some aspects, an instrument panel of a automobile includes a sound duct having a first end at a first location within the instrument panel. The first end is adapted to couple to a removable module. The duct has a second end at a second location that is distinct from the first location.

Implementations may include one or more of the following. The second location is in a space where the instrument panel interfaces with a forward bulkhead of the automobile when the instrument panel is installed in the automobile. The second location is in a space where radiated sound efficiently drives selected audio modes of the automobile when the instrument panel is installed in the automobile.

Advantages include providing sound from a centrally-located acoustic package to an efficient drive point at another location in the vehicle.

DESCRIPTION

It is advantageous in a vehicle audio system to generate low-frequency acoustic signals from the front area of the passenger compartment. This improves the overall quality of low-frequency acoustic signals compared to systems in which low-frequency acoustic signals are generated only in the rear area of the passenger component. For example, a bass transducer located in the front of the passenger compartment can generate low-frequency acoustic signals that enhance the various low-frequency modes in the passenger compartment. U.S. patent application Ser. No. 11/551,410, titled Low Frequency Electroacoustical Transducing in a Vehicle, filed on Oct. 20, 2006, and incorporated here by reference, described a system in which the volume normally occupied by entertainment system electronics is used as an acoustic volume for a bass transducer to provide good low-frequency response at the front of a vehicle, in the instrument panel. In that example, sound from the low-frequency transducer was coupled to the passenger compartment by allowing it to leak from gaps in the instrument panel.

Low-frequency sounds can be further enhanced by controlling their drive point, the point at which they are delivered to the passenger compartment. A location near the center of the instrument panel is convenient for user interaction, especially if some part of the audio system is to be removable, as described below. Such a location is not ideal acoustically, however, as a drive point for low-frequency sounds.

Figure 1:
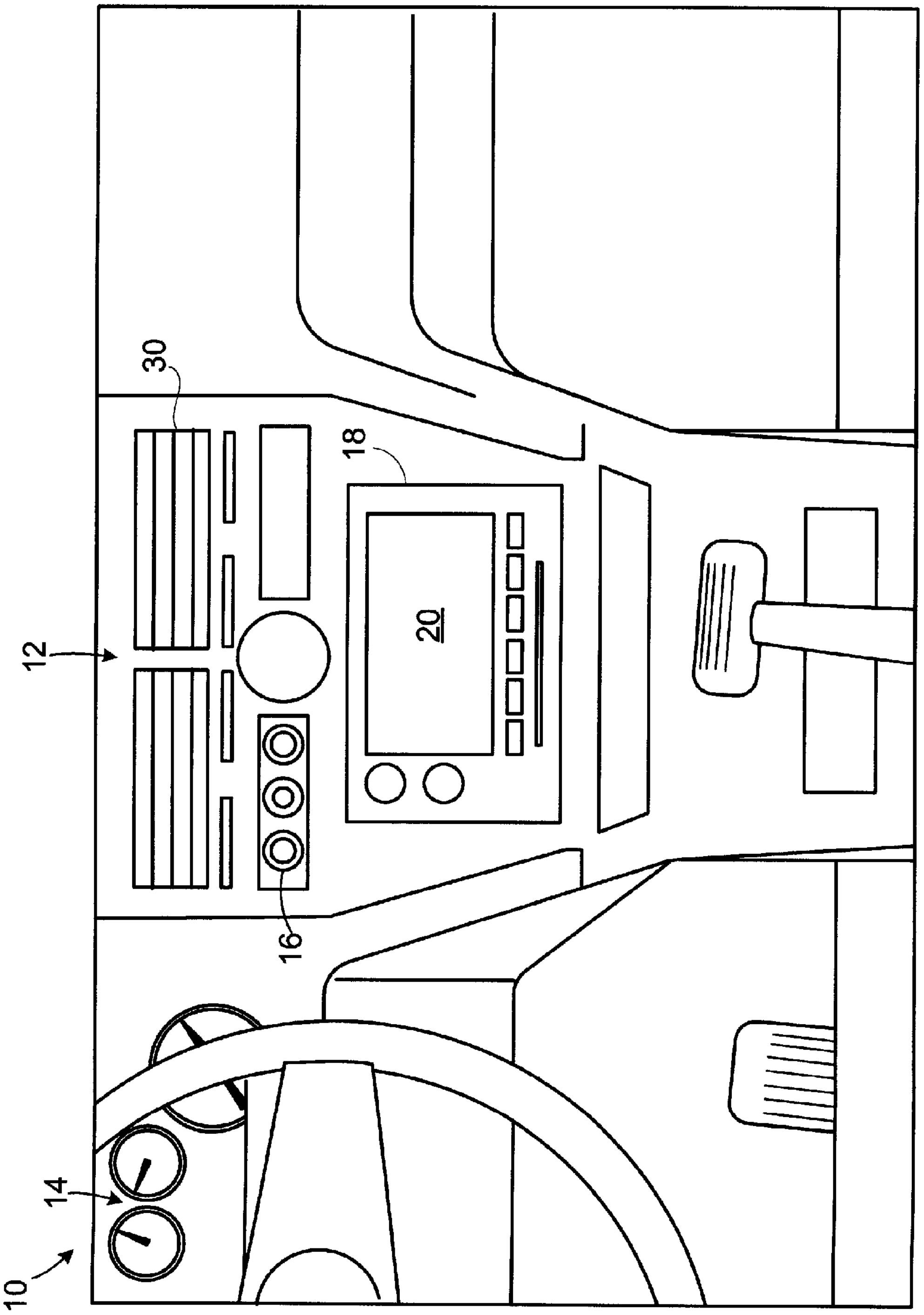
FIGS. 1-4 show an instrument panel of a vehicle.
Figure 2:
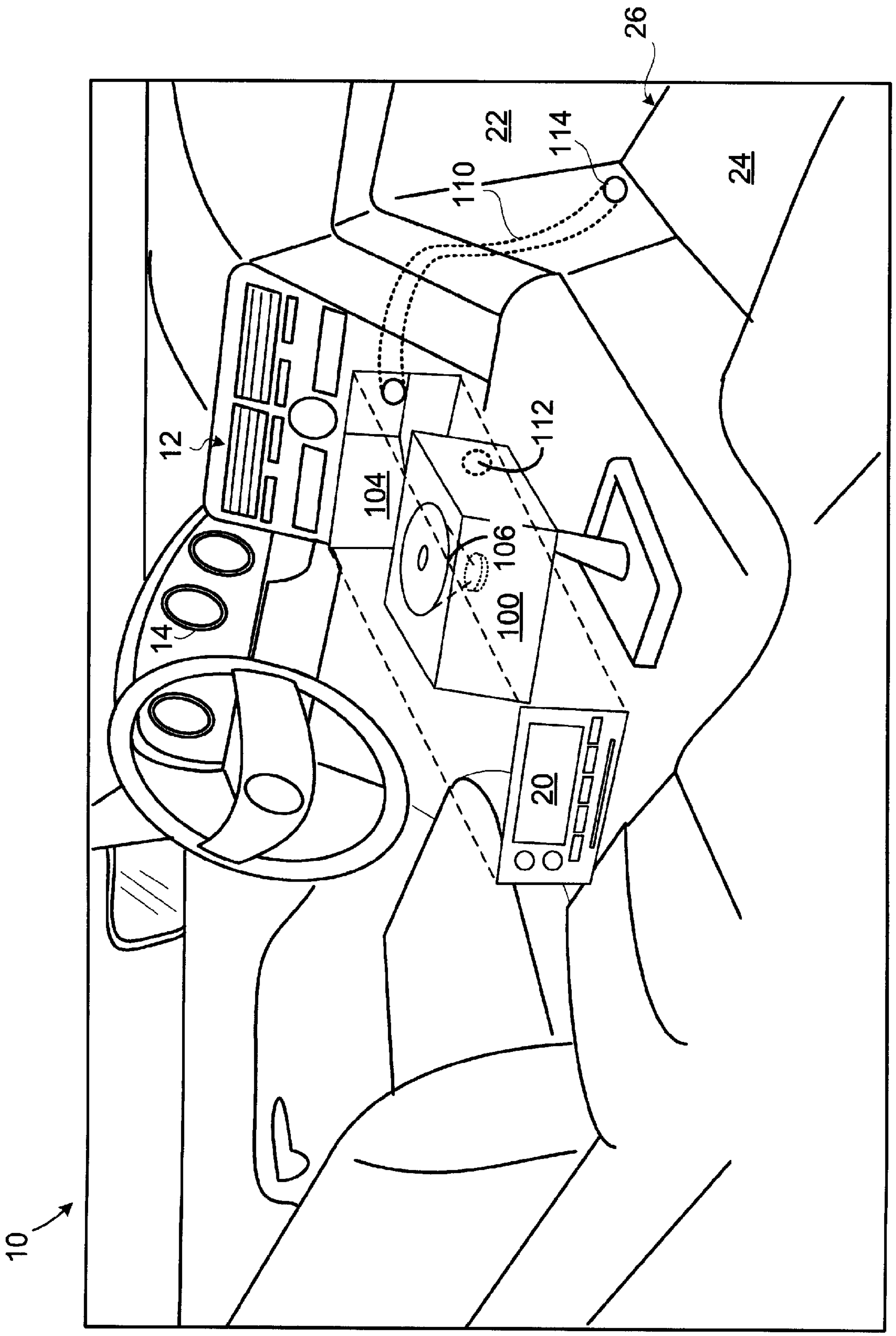

FIGS. 1 and 2 show the interior of a vehicle 10 having a vehicle instrument panel 12 that includes an audio system 18. Most factory-installed audio systems include a control interface 20 that is accessible to the driver and front passenger and an electronics unit (not shown) that is controlled by the control interface 20. For convenience, the control interface 20 is usually located near the center of the instrument panel 12 but is not limited to this location. For example, audio controls may be located on the steering wheel or on a console between the driver and passenger seats. As in the example of the above-mentioned patent application, the audio system 18 includes a low-frequency driver 106 located in an acoustic package 100 in a space 104 behind the control interface 20.

The acoustic package 100 improves the quality of audio playback in the vehicle 10 by repositioning the drive point from which it delivers low-frequency audio signals, for example, in the range of 50-100 Hz, to another location within the vehicle. In particular, driving low-frequency audio from near surfaces at the front of the vehicle, in some examples at the forward bulkhead 22 or near the floor 24, efficiently couples low-frequency audio from the acoustic package to desirable acoustic modes within the passenger compartment. Positioning the drive point near an intersection of walls, such as the intersection 26 between the forward bulkhead 22 and floor 24, may provide even better coupling. Improving the efficiency of coupling from the audio signal source to the passenger compartment provides improved acoustic response and greater sound pressure levels, especially in the lower frequencies of the audible spectrum.

Figure 3:
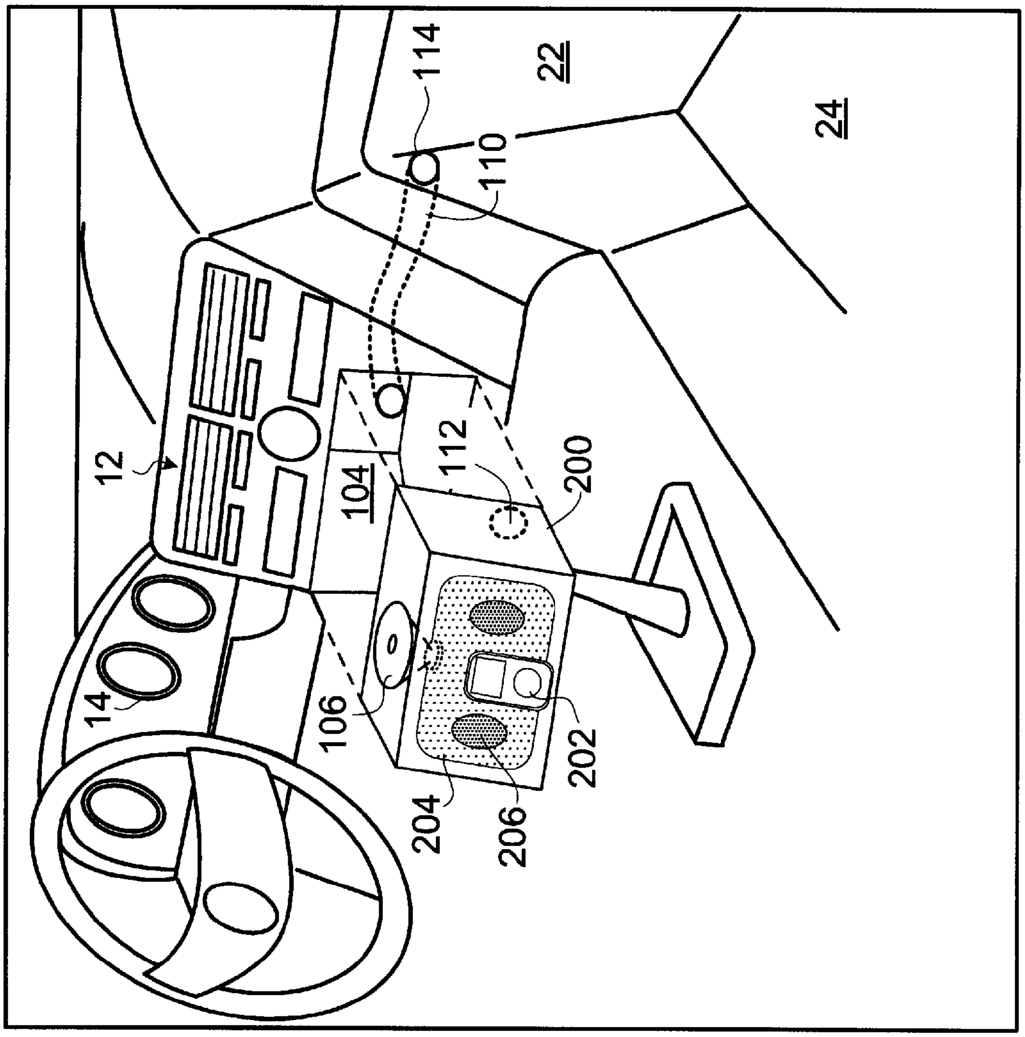
Figure 4:
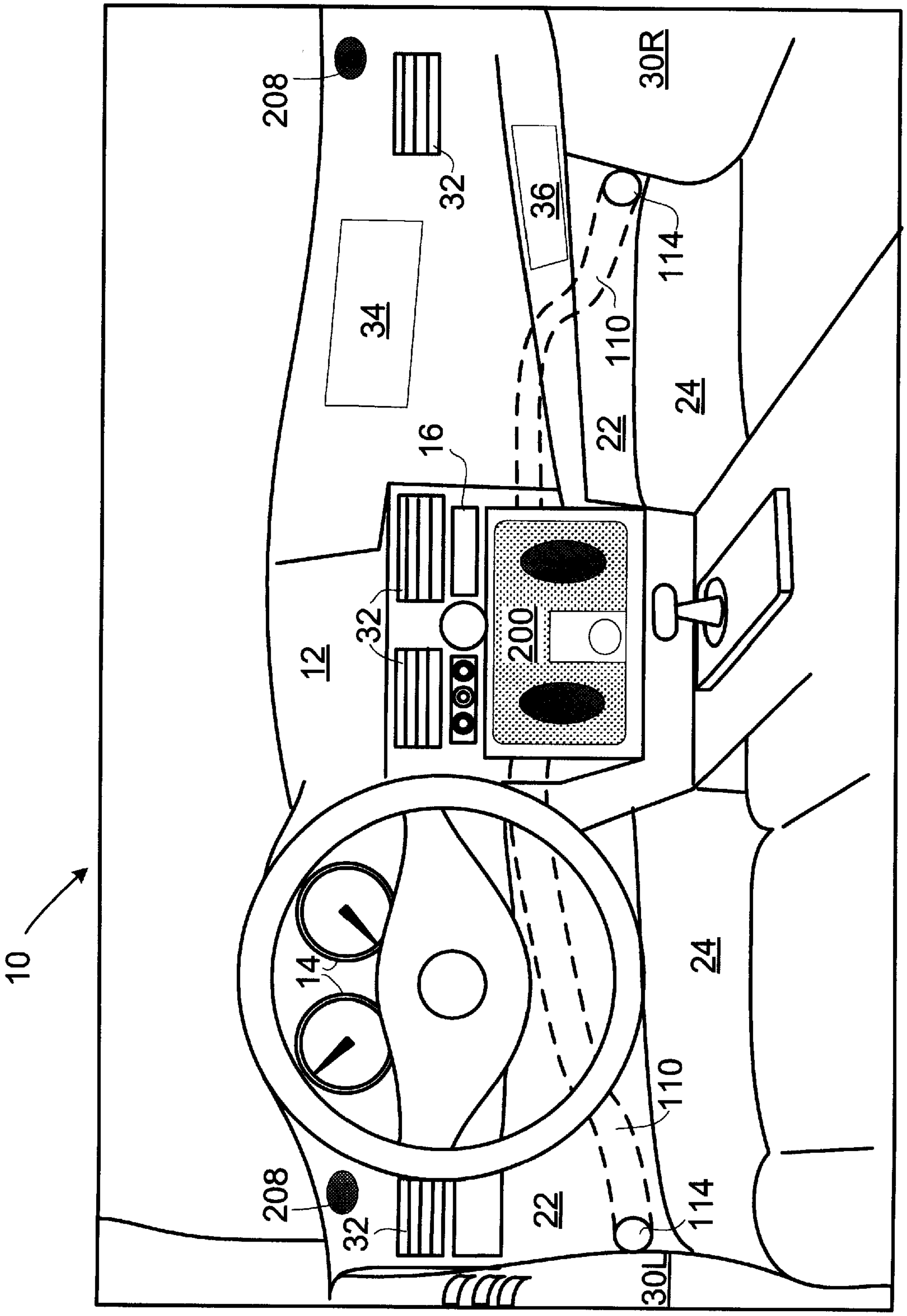

In some examples, a duct 110 coupled to an audio output port 112 of the acoustic package 100 routes sound from the output port 112 to another point 114 in the front of the vehicle. This point 114 is selected to be a drive point where the sound is better able to couple to an acoustic mode of the vehicle interior. In the example of FIG. 2, the duct 110 moves the drive point down and forward to the intersection 26. In some examples, as shown in FIG. 3, the duct moves the drive point forward to the bulkhead 22 at the back of the instrument panel 12. In other examples, as shown in FIG. 4, the duct 110 additionally moves the drive point away from the center of the vehicle 10, to one side 30R or the other 30L or both. Various paths can be used to accommodate the other contents of the instrument panel 12, such as displays 14, climate control controls 16 and ducts 32, airbags 34, and storage 36. FIGS. 3 and 4 also show a removable version 200 of the acoustic package 100, described in more detail below.

In some examples, the duct 110 also modifies the acoustics of the acoustic package 100 by acting as an acoustic volume, bass reflex port, acoustic waveguide, or other acoustic structure. For example, the acoustic package 100 may be suitable for producing low-frequency sounds down to 70 Hz on its own, while the duct 110 allows reproduction of sounds down to 50 Hz. By way of definition, we use duct to refer to a tube that repositions sound, while waveguide refers to a tube that is specifically shaped to enhance resonant modes of the sounds delivered to it, as described in U.S. Pat. No. 5,170,435, the entire contents of which are incorporated here by reference.

In some examples, the output port 112 is a waveguide outlet, as described in U.S. Pat. No. 5,170,435, or a bass reflex port, as described in U.S. Pat. No. 4,549,631, the contents of which are also incorporated here by reference. Such a port or outlet acts like an acoustic transducer, from the point of view of a listener some distance away from the drive point. When the port 112 is coupled to the duct 110, the drive point 114 may function as an acoustic transducer in the same way as the port 112 does when not connected, that is, it outputs the same audio signal that is output by port 112, possibly with some alteration. In some examples, the duct is designed to change the acoustic response of the port 112, for example, by providing additional acoustic mass or acoustic waveguide length. This may be done, for example, to adjust the resonant frequency or the frequency range of the drive point 114 relative to that of the port 112. Such adjustments may include extending the frequency range or removing undesired peaks or nulls at particular frequencies. In some examples, the duct 110 may include an acoustic volume followed by an acoustic port or waveguide, or some other combination of acoustic elements.

In the case that the duct 110 acts as a waveguide, the length of the duct (possibly in combination with the length of any waveguide inside the acoustic package 100) is selected to be one quarter of the wavelength of the lowest frequency sound the system is intended to produce. That is, the lowest frequency sound the waveguide produces is a function of its length, so its length is selected to provide resonance at a particular desired frequency, such as 60 Hz. Achieving a specific length may require that the duct take an indirect path between the port 112 and the drive point 114, such as a serpentine path. U.S. patent application Ser. No. 12/020,978, filed on Jan. 28, 2008, and titled Waveguide Electroacoustical Transducing, the entire contents of which are incorporated here by reference, describes a waveguide structure having an acoustic volume coupled to it along its length. Such a structure may take better advantage of available space than a uniform waveguide or volume alone.

In some examples, the sound duct has a cross-sectional area that varies along its length. The cross section may vary gradually along the length of the duct or it may be sharply constricted at one point, such as the end.

Figure 5A:
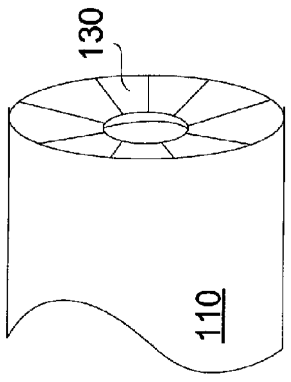
FIGS. 5A and 5B show details of a duct.
Figure 5B:
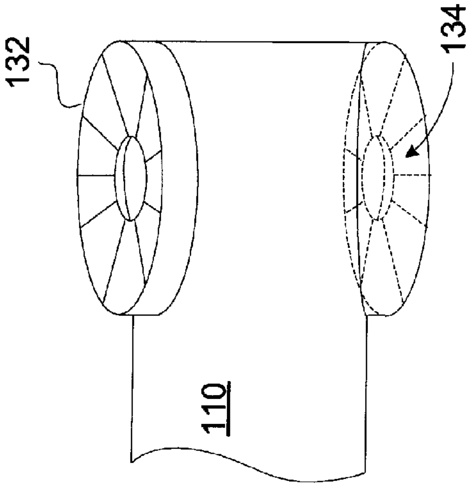

At the drive point 114, there are various options for how the duct couples to the passenger compartment. In addition to an opening acting as a bass reflex port or waveguide outlet, as described above, the duct 110 may terminate in one or more passive radiators, of the type described in U.S. Pat. No. 7,133,533, for example, the contents of which are incorporated here by reference. As shown in FIG. 5A, single passive radiator 130 may function like an acoustic transducer, while a pair of opposed passive radiators 132, 134 may additionally avoid imparting undesired mechanical vibrations to the vehicle structure and trim around the drive point as shown in FIG. 5B.

In some examples, as shown in FIGS. 3 and 4, the acoustic package 100 is included in a removable unit 200. The removable unit 200 may be a portable audio playback device operable on its own or when docked to another acoustic package, as described in more detail below. In some examples, the removable unit 200 is sized to fit in the standard space of a car radio, such as a 2-DIN volume, as described in U.S. patent application titled Integrated Vehicle Audio System, filed at the same time as this application and incorporated here by reference. In some examples, the audio system interface 20 is part of the removable unit 200. In some examples, the removable unit 200 has a minimal interface, such as one providing only playback from a built-in radio or an attached media storage device 202, and the primary interface 20 remains in the instrument panel. In some examples, the removable unit 200 provides sound through a front grill 204 from the low-frequency electroacoustic transducers 106 or from additional built-in mid- or high-frequency or full-range electroacoustic transducers 206. The port 112 may output sound from only the low-frequency transducers 106 or from the additional transducers 206. In some examples, additional electroacoustic transducers 208 are provided in other locations within the vehicle. Signals for these transducers 208 may be provided by electronics within the removable unit 200 or from the built-in audio system 18, if separate.

Figure 6:
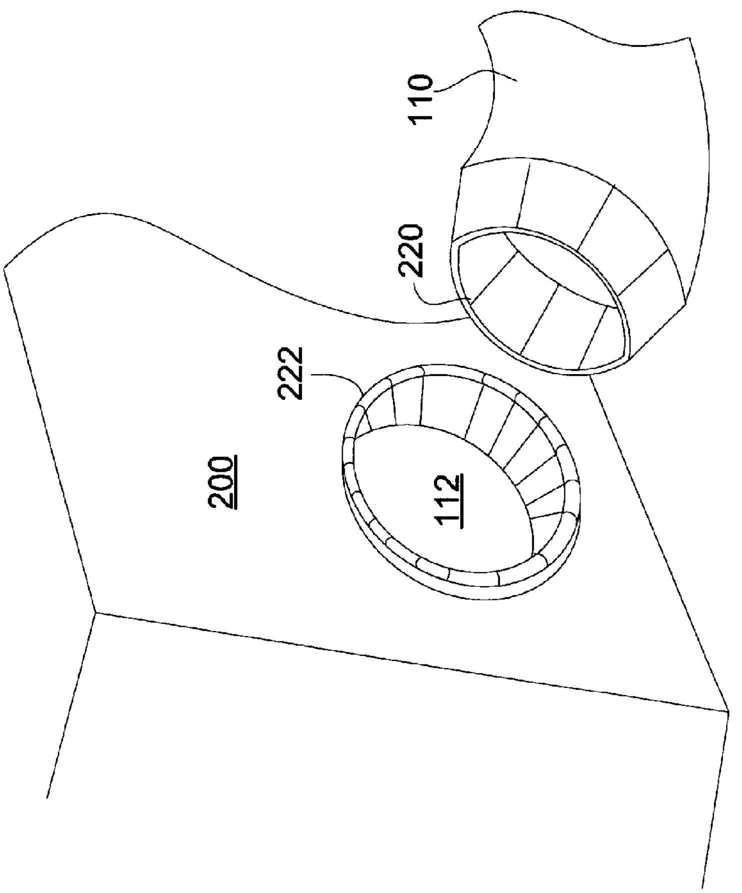
FIG. 6 shows a detail of a portable audio device and a duct.

In examples where the acoustic package 100 is removable, for the duct 110 to reposition the drive point from the output port 112 to the in-vehicle drive point 114, the duct 110 and output port 112 need to have relatively good acoustic coupling when the acoustic package is installed. In some examples, as shown in FIG. 6, this is achieved by providing mating features 220, 222 on the duct 110 and output port 112. When the removable unit 200 is inserted into the space 104, the mating features 220, 222 form an acoustic coupling between the duct 110 and the output port 112.

Figure 7:
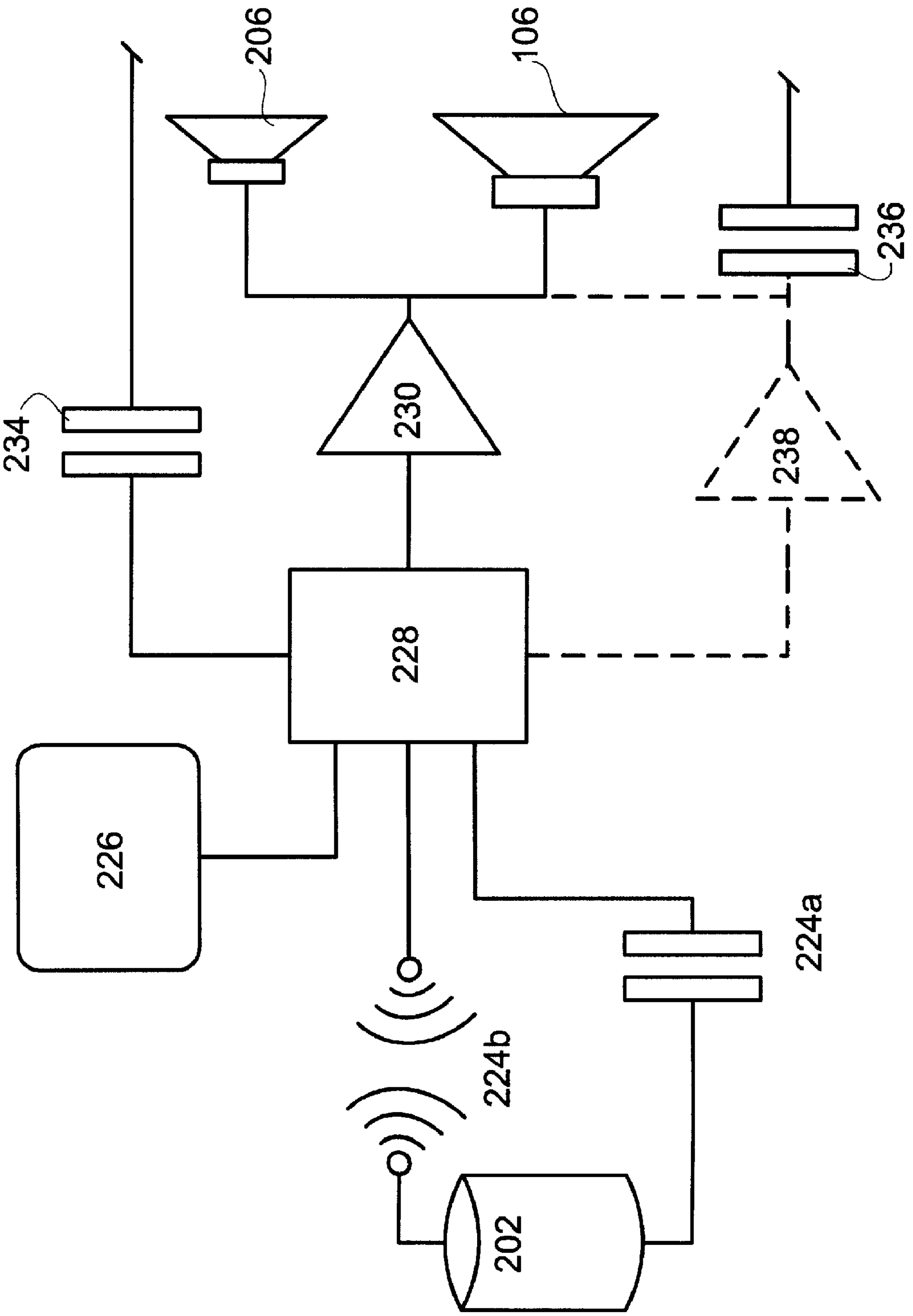
FIG. 7 shows a block diagram of electronics for a portable audio device.

A general electronic architecture for the removable unit 200 is shown in FIG. 7. Input audio content is received from the media storage device 202, which may be an external device connected through a connector 224*a* or a wireless interface 224*b*. External media devices that may be used with such a system include portable media players, wireless telephones, or video game systems, to name a few examples. The connector 224*a* may be a standard analog or digital audio connector, a standard data connector such as a USB port, or a proprietary connection specific to a given portable media device. The wireless interface 224*b* may use Bluetooth® technology, for example, or any other system for wireless transfer of media or other data. A user interface 226 allows the user to control the portable media device. In some examples, the user interface 226 is part of the external device 202, or a combination of the external device and built-in controls. For example, if a portable media player is connected (including wirelessly), the media player's interface may be used to control media selection while controls integral to the portable device 200 may control the volume and other audio settings, such as bass and treble levels, balance, and fade.

The inputs from the storage 202 and interface 226 are provided to a processor 228. The processor may be any of a number of devices used to process audio signals, including switches, active or passive networks, digital-to-analog and analog-to-digital converters, digital signal processors, or a programmed microprocessor. One of more of these devices may be used together, or no processor may be present. After any processing, audio signals are passed to an amplifier 230 that amplifies the signals to an appropriate level for driving electroacoustic transducers 106 and 206. In some examples, the processing is performed in the amplifier 230. In some examples, as noted above, multiple transducers 106, 206 are used for different audio bands. Multiple amplifiers may also be used, or a single amplifier may be used to drive the multiple transducers. Dividing the signals into appropriate frequency ranges may be done in the amplifier 230 or in the processor 228, or with a passive acoustic network in the acoustic package 100 (not shown).

In some examples, the portable device 200 includes additional connections 234, 236 for receiving inputs from the vehicle or providing additional outputs. For example, controls mounted on the steering wheel may be coupled to the portable device 200 through an input connection 234, allowing the driver to control audio playback without removing his hands from the wheel. Other audio sources may also be connected to the portable device, such as an in-vehicle CD changer or satellite or terrestrial radio tuner. The outputs may be used for driving additional electroacoustic transducers, for example, loudspeakers installed in other locations of the vehicle, mentioned above. This may provide for greater separation of stereo or multi-channel (e.g., surround sound) signals, improving stereo separation and the perceived size of the soundstage. Multi-channel signals may be directly provided by an audio source (internal or external to the portable device 200) or may be generated from fewer signals (e.g., stereo or down-mixed multi-channel signals) by a digital signal processor. Driving additional transducers may be done directly, using an amplifier 238 internal to the portable device 200 and amplified output connections 236, or it may be done by providing signals to amplifiers installed within the vehicle, or a combination. The amplifier 238 may be the same amplifier 230 used for the internal transducers 106 and 206 or an additional amplifier. In some examples, the portable device 200 includes many or all of the electronics needed for it to replace the installed audio system 18. That is, any or all of the electronics shown in FIG. 7 may be included in the portable device 200, and the others installed in the audio system 18, including in the interface 20 or any in-vehicles amplifiers.

Figure 8:
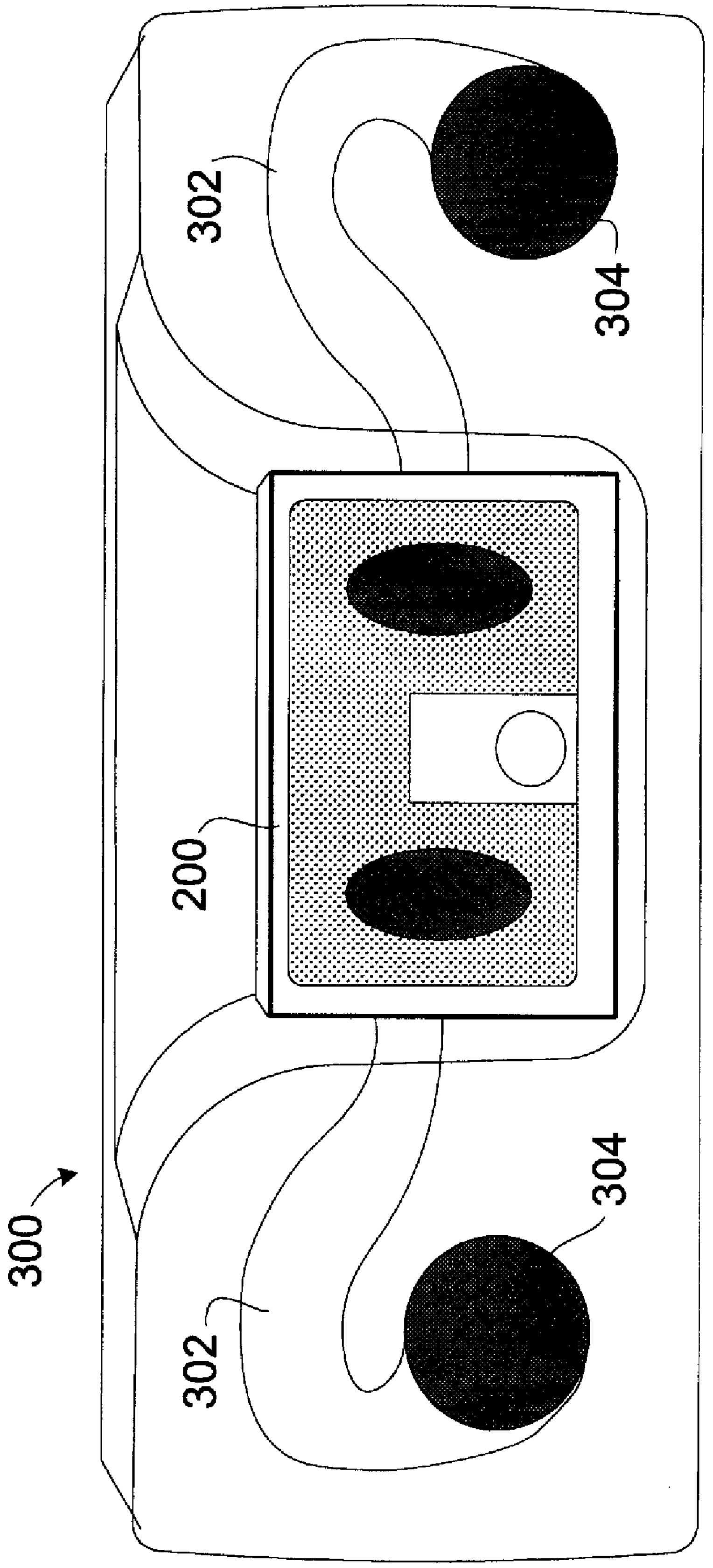
FIG. 8 shows a portable audio device and a docking station.

In some examples, as shown in FIG. 8, the portable device 200 including the acoustic package 100 is also usable with at separate docking station 300, such as an in-home or portable audio system. As in the vehicle 10, the docking station 300 may include one or more ducts 302 to position corresponding drive points 304 away from the removable unit 200, to provide better acoustic coupling to the room in which the docking station is used. The docking station 300 may also provide additional media sources, such as a television tuner, a home theater, and larger-capacity or networked music storage. In some examples, such as when the removable unit 200 has a minimal user interface, the docking station may provide an additional or replacement user interface for the electronics in the removable unit 200.

The portable unit 200 in combination with an in-car duct 110 and in-home docking station 300 allows a user to take a single acoustic package from home to car and elsewhere. This may decrease the individual cost of each system and allow the user to take preferred signal processing settings from place to place, to name a few advantages.

What is claimed is:

1. A sound reproduction system in a vehicle comprising:

an acoustic package including an electroacoustic transducer; and a sound duct that carries the sound from the electroacoustic transducer;

wherein the sound duct carries the sound to an outlet at a location in the vehicle at which radiated sound efficiently drives selected audio modes of the vehicle.

2. The apparatus of claim 1 wherein the location in the vehicle of the sound duct outlet is at a forward bulkhead of the vehicle.

3. The apparatus of claim 2 wherein the location in the vehicle of the sound duct outlet is at the forward bulkhead where the forward bulkhead meets a floor of the vehicle.

4. The apparatus of claim 1 wherein the sound duct includes a waveguide.

5. The apparatus of claim 1 wherein the sound duct includes a bass reflex port.

6. The apparatus of claim 1 wherein the sound duct includes an acoustic volume.

7. The apparatus of claim 1 further comprising a first passive radiator attached to the sound duct at the outlet of the duct.

8. The apparatus of claim 7 further comprising a second passive radiator attached to the sound duct at the outlet of the duct, the second passive radiator being positioned facing the first passive radiator so that vibrations imparted to surrounding structures from the first and second passive radiators cancel each other.

9. The apparatus of claim 1 further comprising electronics to operate the electroacoustic transducer wherein the electronics and the acoustic package together form a removable module.

10. The system of claim 1 in which the duct is contained within an instrument panel of the vehicle.

11. A method of reproducing sound in a vehicle comprising:

coupling an acoustic package including an electroacoustic transducer to a sound duct at a first location, the duct having a first end at the first location and a second end at a second location in the vehicle at which radiated sound efficiently drives selected audio modes of the vehicle, and providing sound generated by the electroacoustic transducer to the duct.

12. A sound reproduction system in a vehicle comprising:

a removable module including a electroacoustic transducer; and a sound duct that carries the sound from the electroacoustic transducer at a first location to an outlet at a second location in the vehicle that is distinct from the first location.

13. The system of claim 12 in which the second location is a location at which radiated sound efficiently drives selected audio modes of the vehicle.

14. The system of claim 13 also comprising an interface for coupling the transducer to the duct.

15. The system of claim 14 in which the interface comprises a bass reflex port.

16. The system of claim 14 in which the interface comprises an acoustic volume.

17. The system of claim 14 in which the interface comprises an acoustic waveguide.

18. The system of claim 12 in which the duct includes an interface for coupling to the transducer.

19. The apparatus of claim 12 wherein the removable module fits within a 2 DIN volume.

20. A method of reproducing sound in a vehicle comprising:

coupling a removable module having an electroacoustic transducer to a duct at a first location, the duct having a first end at the first location and a second end at a second location in the vehicle that is distinct from the first location, and providing sound generated by the electroacoustic transducer within the removable module to the duct.

21. An instrument panel of a automobile comprising:

a sound duct having a first end at a first location within the instrument panel and adapted to couple to a removable module and a second end at a second location that is distinct from the first location.

22. The instrument panel of claim 21 in which the second location is in a space where the instrument panel interfaces with a forward bulkhead of the automobile when the instrument panel is installed in the automobile.

23. The instrument panel of claim 21 in which the second location is in a space where radiated sound efficiently drives selected audio modes of the automobile when the instrument panel is installed in the automobile.

* * * * *